Aug. 3, 1937.        C. MILLER        2,089,033
FOIL APPLYING DEVICE
Filed Jan. 16, 1937        2 Sheets-Sheet 1

INVENTOR.
CHRIS MILLER
BY
ATTORNEY.

Aug. 3, 1937.    C. MILLER    2,089,033
FOIL APPLYING DEVICE
Filed Jan. 16, 1937    2 Sheets-Sheet 2

INVENTOR.
CHRIS MILLER
BY
ATTORNEY.

Patented Aug. 3, 1937

2,089,033

UNITED STATES PATENT OFFICE 2,089,033

FOIL APPLYING DEVICE

Chris Miller, Detroit, Mich.

Application January 16, 1937, Serial No. 120,891

15 Claims. (Cl. 18—5.7)

This invention relates to the manufacture of dentures in which the artificial teeth are mounted in a plate formed of a molded plastic. Certain resinoids, such as the now widely used "Luxene", have proven to be especially suitable when properly handled, and the best dentures being made today are formed of this type of substance. In the preparation of dentures from these materials, it has been found that the plastic mold in which the denture is formed must be lined with some impervious material, such as tin foil, which is chemically inert towards the resinoid. Unless such a lining is used, the moisture in the plaster causes the resinoid to become white and opaque instead of being a life-like translucent pink.

It has hitherto been the practice to apply the tinfoil to the mold by hand and to laboriously smooth it down and fit it into the surface irregularities. One of the principal objects of this invention is to provide a method of and apparatus for fitting the tinfoil to the mold quickly and accurately.

Another object of the present invention is to provide an apparatus by means of which tinfoil can be applied to the mold by a person having less skill and patience than is now generally required.

In order to explain the invention, reference is made to the drawings, in which

Figure 5:
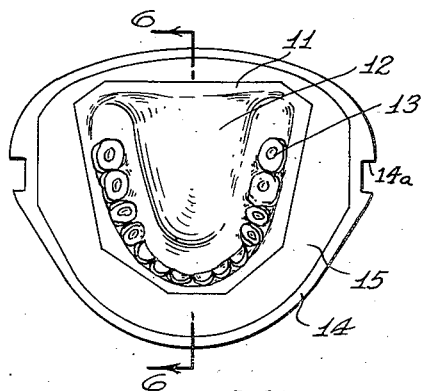
Fig. 5 is a plan view of a waxed up-case invested in the lower half of a flask before the tinfoil is applied.
Figure 7:
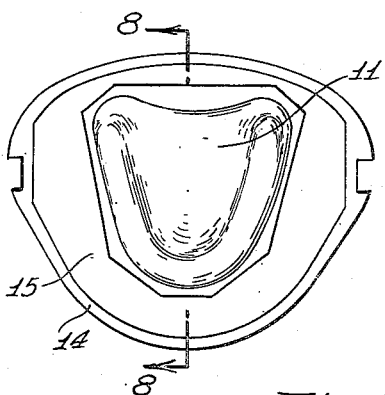
Fig. 7 is a plan view of the waxed-up case and lower half of the flask shown in Fig. 5 after the teeth and wax have been removed.
Figure 6:
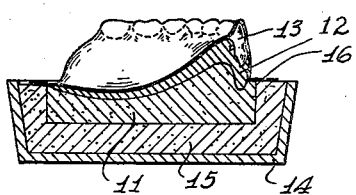
Fig. 6 is a sectional view on the line 6—6 of Fig. 5 looking in the direction of the arrows, but taken after the tinfoil has been applied.

In the preparation of dentures, an artificial stone model 11 having the shape of the gums and other mouth parts which the denture is to fit is prepared. On this model 11, the denture is formed in wax 12, and the teeth 13 are set into the wax 12 in their proper positions, forming what is called the waxed-up case. The waxed-up case 11, 12, 13 is then invested in the lower half 14 of a flask by means of plaster 15, as shown in Figures 5 and 6, and it is covered with tinfoil 16. The tinfoil 16 is applied in a plurality of pieces so that it will be able to fit the surface of the waxed-up case without being stretched excessively at any point. The lower half 14 of the flask and the waxed-up case 11, 12, 13 covered with tinfoil 16 are then placed in the apparatus shown in Fig. 1.

This apparatus forces the tinfoil 16 to fit tightly against the surfaces of the teeth 13, the wax 12, the model 11 where it extends beyond the wax 12, and the plaster 15. It consists of a circular base 17 with an upstanding rim 17a within which the end of a cylindrical shell 18 fits. A guard ring 19 covers the edge of the flask 14 and the space between the flask 14 and the shell 18. The guard ring 19 is provided with a pair of depending lugs 19a which engage grooves 14a in the flask and center it under the opening in the guard ring 19.

A hollow rubber ball 20 is placed on top of the guard ring 19 and the flask 14 and its contents. The space within the ball 20 is full of water 21 or other liquid, but the amount of water 21 is preferably not enough to fill the ball out to a spherical shape. In practice, I find that the best results are obtained by first completely filling the ball 20 with liquid 21, making certain that all air is expelled and then expelling about one third of the water, although this amount may vary within wide limits.

The ball 20 is partially covered by a heavy rubber guard 22 in the form of a hemispherical shell with a large deeply serrated hole in the top. The ball 20 and guard 22 are covered by a piston 23 which can slide in the cylinder or shell 18. The underside of the piston 23 is hollowed to receive the guard 22 and ball 20, and the top is provided with circular strengthening ribs 23a.

The apparatus assembled as described above is then placed in a press and the piston 23 forced towards the base 17. The pressure set up in the liquid 21 within the ball 20 causes its lower part to press tightly against the wax model 12, the teeth 13 and the plaster 15. The tinfoil 16, which lies under the ball 20, is thus pressed against the wax model 12 and the teeth 13 with considerable pressure. In practice, with a force of several thousand pounds exerted by the press, the pressure on the tinfoil 16 may be as much as three hundred pounds per square inch. This pressure ensures that the lower surface of the tinfoil 16 assumes the exact shape of the surface of the wax model 12 and the teeth 13.

Figure 9:
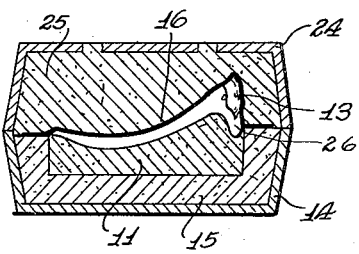
Fig. 9 is a sectional view of the assembled flask after the wax has been removed.

The lower half 14 of the flask with the tinfoiled waxed-up case comprising the model 11, the wax 12, the teeth 13 and the tinfold 16 are then removed from the tinfoiling apparatus and the upper half 24 of the flask is invested. This consists of filling it with plaster 25 so that the tinfoiled waxed up case 11, 12, 13 and 16 is secured in the upper half 24 of the flask as well as in the lower half 14. The wax 12 is then melted out leaving a cavity 26 (as shown in Fig. 9) the exact shape of the desired denture. The tinfoil 16 and teeth 13 are left imbedded in and adhering to the plaster 25 in the upper half 24 of the flask.

Figure 1:
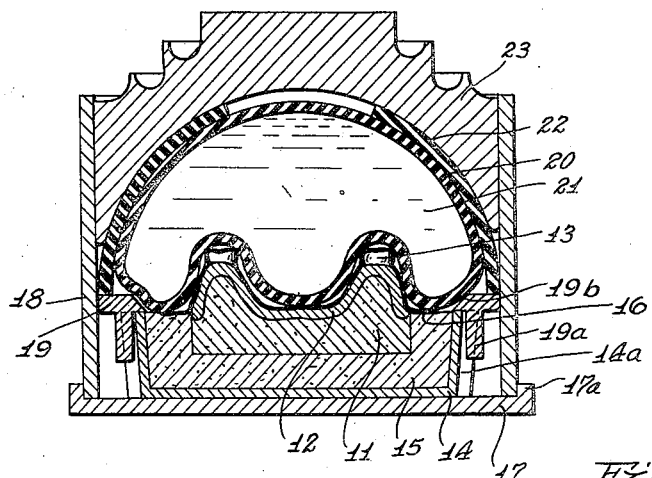
Fig. 1 is a sectional view through one of the preferred forms of the invention as it appears in carrying out a step of one process for which it is adapted.
Figure 2:
Fig. 2 is an elevation of a rubber guard member forming a part of the apparatus shown in Fig. 1.
Figure 8:
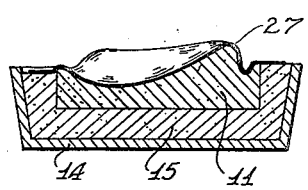
Fig. 8 is a sectional view on the line 8—8 of Fig. 7 looking in the direction of the arrows, but taken after the tinfoil has been applied.

The flask 14 and 24 is then opened, any wax 12 remaining in the cavity 26 is removed, and the model 11 is covered with tinfoil 27 which is pressed down tightly by the apparatus shown in Fig. 1. This second application of tinfoil is carried out exactly like the first application except that the tinfoil 27 is applied directly to the model 11 after the wax 12 and teeth 13 have been removed from it, while the tinfoil 16 was applied to the entire waxed-up case comprising the model 11, the wax 12 and the teeth 13. The result of the first and second tinfoiling operations are shown in Figs. 6 and 8 respectively.

Since the tinfoil 16 applied in the first operation was transferred to the upper half 24 of the flask as described above, the surfaces of the cavity 26 carried by both halves 14 and 24 of the flask are now coated with tinfoil 16 and 27, and the mold thus prepared is ready for the molding of the denture.

One or two details not mentioned above contribute to the durability of the device and the ease with which it is handled. The lugs 19a on the guard ring 19 are tapered to facilitate placing it on the flask 14, and the edge 19b of the aperture in the ring 19 is beveled or rounded to avoid cutting the ball 20. The rubber guard 22 is normally larger in diameter than the inside of the cylinder or shell 18 so that it fits tightly enough to hold both itself and the piston 23 above it in place when the apparatus is disassembled. Thus the shell 18, guard 22, and piston 23 can be conveniently picked up and placed in position together.

The apparatus described above can also be used as shown in Fig. 3 for carrying out a new and improved process producing better results.

Figure 3:
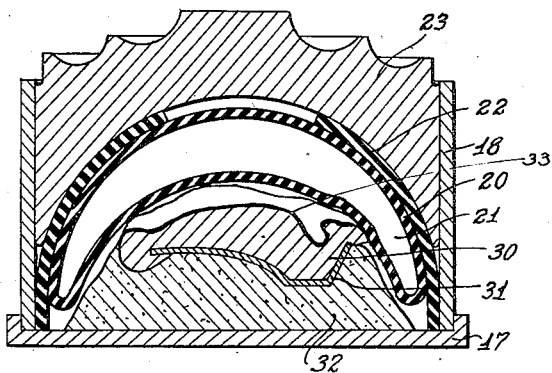
Fig. 3 is a sectional view through the form of the invention shown in Fig. 1 as it appears in carrying out a step of a second process for which it is adapted.

In this process, the impression 30 of the patient's gums is made of some rigid material such as the thermo-plastic compositions similar to sealing wax commonly used for this purpose. The impression 30 carried by a conventional impression tray 31 is set in a material such as plaster 32 in such a way that the portion of the surface of the impression 30 which corresponds to the contact surface of the future denture is exposed but the rest of the mass is smooth. This can be done in a tray similar to the lower half 14 of a flask or in a tray adapted to just fit within the shell 18, making the use of the guard ring 19 unnecessary, or it can be done as shown directly on the base 17. In any case, the exposed surface of the impression 30 is covered with tinfoil 33 and the tinfoil 33 is pressed down tight by means of the apparatus 18, 20, 21, 22 and 23 as shown in Fig. 3.

An artificial stone model similar to the model 11 shown in Figures 1, 6, 7, 8, 9 and 10 is then cast in the conventional manner on the tinfoiled impression 30. When the impression 30 is carefully broken away from the model, the tinfoil 33 remains on the model. The model is then waxed up, and the teeth placed, forming the waxed-up case which differs from those made prior to the introduction of this process and from the waxed-up case 11, 12 and 13 described above in that there is a layer of tinfoil 33 between the model and the wax. The waxed-up case is then invested in the lower half of a flask, and it is coated with a second layer of tinfoil on the other side of the wax. The tinfoiled case in then invested in the upper half of a flask and the wax melted out, leaving the second layer of tinfoil and the teeth adhering to the plaster in the upper half of the flask and the first layer 33 adhering to the plaster in the lower half. The investing of the case in the lower and upper halves of the flask, the application of the second layer of tinfoil, and the removal of the wax are similar to those operations as carried out with the waxed-up case 11, 12 and 13 shown in Figs. 1, 5, 6 and 9, but in this improved process a layer of tinfoil 33 is already in position against the model corresponding to the model 11. Therefore, after the wax is removed, both upper and lower surfaces of the molding cavity have tinfoil on them.

The advantage of the improved process described immediately above is that the layer of tinfoil 33 is applied to a positive impression instead of to a negative one. In the conventional process, the tinfoil is applied to the model, which is a negative, and the thickness of the tinfoil is subtracted from the space in which the denture is molded. Thus the denture is inaccurate by the thickness of the tinfoil. In my process, on the other hand, the tinfoil is applied to a positive, the impression 30, whose place is filled first by the wax and then by the molding material forming the denture. The tinfoil is thus on the outside of the space in which the denture is molded and does not subtract from it. Moreover, any wrinkles that may be formed in the tinfoil are away from the denture forming space instead of in it.

Figure 4:
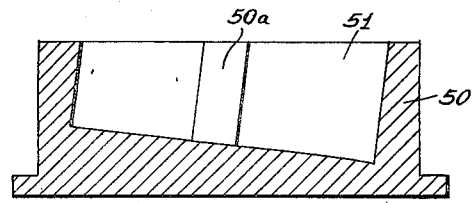
Fig. 4 is a sectional view of a modified form of part of the apparatus shown in Fig. 1.

Modifications of a part of the apparatus described above are shown in Figs. 4 and 10. In Fig. 4 is shown a modified base 50 to replace the base 17 and guard ring 19 shown in Fig. 1. The modified base 50 is intended for use with flasks having a sloping parting line and is made with a recess 51 shaped to hold the bottom of such a flask with its parting surface level. The walls of the recess 51 are provided with projecting portions 50a which fit into and fill grooves provided in the sides of the bottom of the flask for the reception of lugs on the top of the flask.

Figure 10:
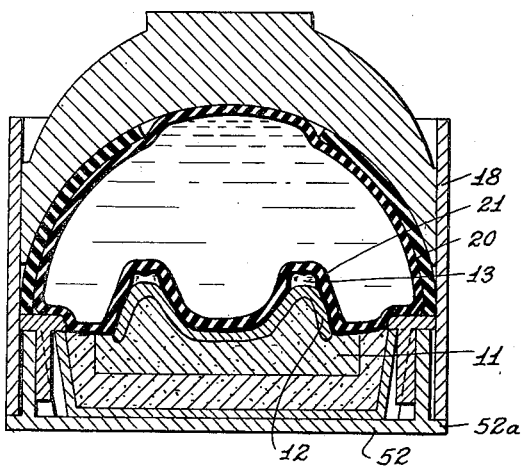
Fig. 10 is a sectional view of a modified form of the invention.

Another modified form of base 52 is shown in Fig. 10. The base 52 is in the form of a shallow cylindrical cup fitting within the shell 18 and having a low circumferential flange 52a upon which the shell 18 rests. This view also shows how the rubber ball 20 fits tightly against the waxed up case 11, 12 and 13 when pressure is applied to the piston 23.

What I claim is:

1. An apparatus for pressing a sheet of flexible material onto a portion of the surface of an irregularly shaped object comprising a cylinder adapted to enclose the object, filler means adapted to be placed around the object to close any passage that may exist in said cylinder around said object, a piston slidable in said cylinder, a flexible-walled hollow member filled with liquid and adapted to be placed between said object and said piston, and a flexible guard adapted to encircle said hollow member and to extend from said filler means to said piston and to lie partly between said hollow member and said piston.

2. An apparatus as described in claim 1 in which said flexible guard is formed of thicker material than said enclosed member.

3. An apparatus as described in claim 1 in which the face of said piston is concave.

4. An apparatus as described in claim 1 in which the edge of said piston in contact with said cylinder is sharper than ninety degrees.

5. An apparatus as described in claim 1 in which said flexible guard has an aperture in the portion between said hollow member and said piston.

6. An apparatus as described in claim 1 in which said flexible guard has a serrated aperture in the portion between said hollow member and said piston.

7. An apparatus as described in claim 1 in which said flexible guard fits in said cylinder tightly enough to support its own weight and that of said piston.

8. An apparatus as described in claim 1 and provided with a removable base upon which said object and said cylinder may rest.

9. An apparatus for pressing a sheet of flexible material onto the exposed surface of an irregularly shaped object invested in a flask comprising a cylinder adapted to encircle said flask, a guard ring adapted to fit in said cylinder and on the rim of said flask, said guard ring serving to close off the space between said flask and said cylinder, a piston slidable in said cylinder, a hollow member having flexible walls and filled with liquid and adapted to fill the space between said flask and guard ring and said piston, and a flexible guard adapted to encircle said hollow member and to extend from said guard ring to said piston and to lie partly between said hollow member and said piston.

10. An apparatus as described in claim 9 in which said guard ring is provided with means for locating said flask with respect thereto.

11. An apparatus as described in claim 9 in which said guard ring is provided with lugs adapted to engage the sides of said flask.

12. An apparatus as described in claim 9 in which said guard ring is provided with lugs adapted to fit into grooves in the sides of said flask.

13. An apparatus as described in claim 9 and including a base adapted to receive and support said flask and said cylinder.

14. An apparatus as described in claim 9 in which the inner edge of said guard ring is rounded.

15. An apparatus for pressing a sheet of flexible material onto the exposed surfaces of an irregularly shaped object invested in a flask having an oblique parting line, said apparatus comprising a base adapted to hold said flask with the parting line level, a cylinder adapted to fit around said base, means adapted to fill the space between the sides of said flask and the walls of said cylinder, a piston slidable in said cylinder, a hollow member having flexible walls and filled with liquid and adapted to fill the space between said flask and means and said piston, and a flexible guard adapted to encircle said hollow member and to extend from said means to said piston and to lie partly between said hollow member and said piston.

CHRIS MILLER.